Patented May 24, 1932

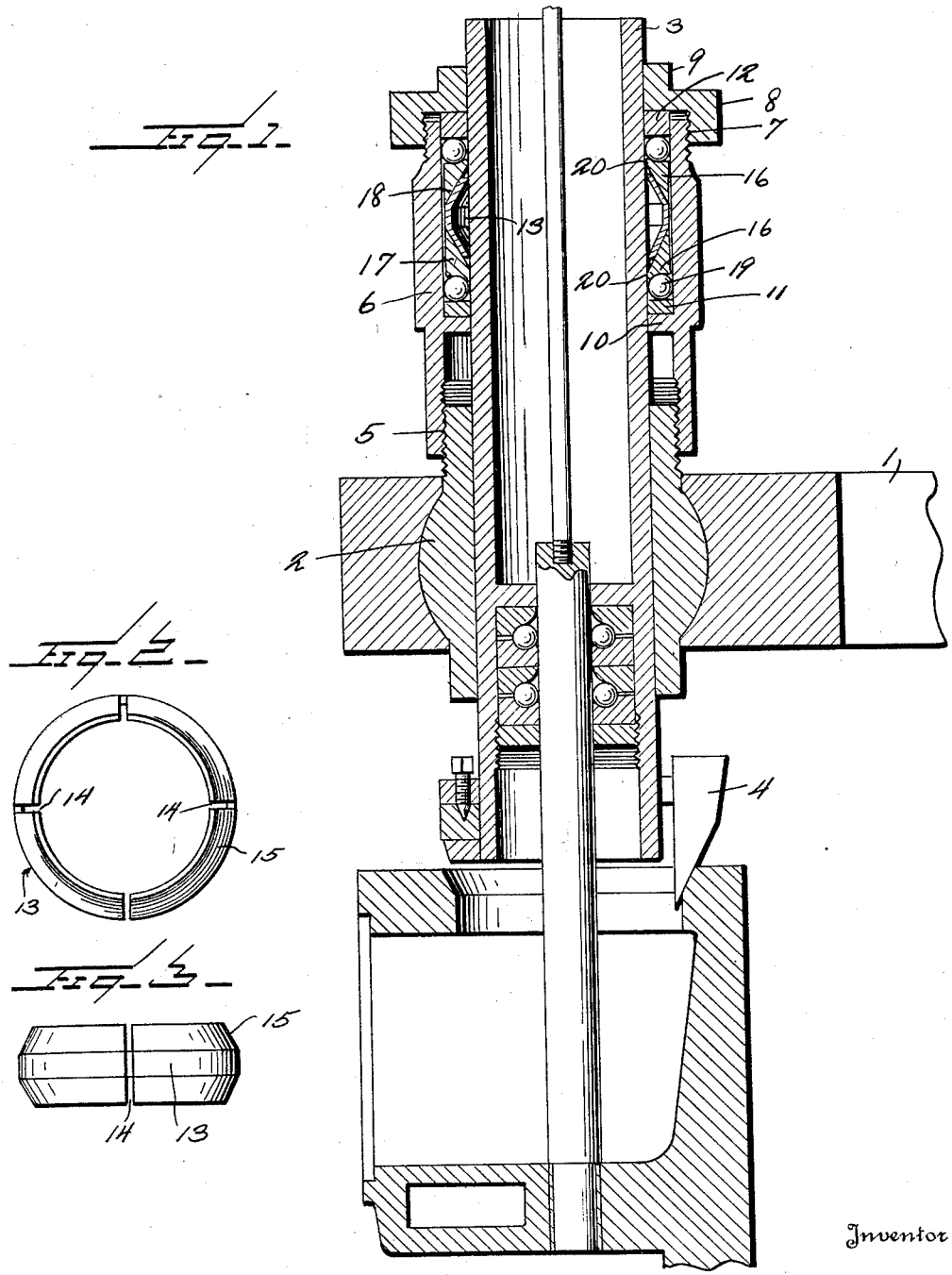

1,859,837

UNITED STATES PATENT OFFICE

GEORGE ELMER MOEN, OF KELSO, WASHINGTON

REAMER SHAFT HOLDER AND FEEDER

Application filed October 1, 1929. Serial No. 396,522.

This invention relates to improvements in reamers particularly those designed for resurfacing valve seats for valves of internal combustion engines.

The primary object of the present invention is to provide an improved support and feeding means for a rotatable reaming carrying shaft, whereby the reamer and shaft may be smoothly fed to the work surface by hand and also whereby the reamer carrying shaft may be easily and quickly removed from or applied to working position.

Another object of the invention is to provide a holding supporting bearing for a rotatable shaft whereby the free rotary movement of the shaft will not be interfered with but movement of the shaft longitudinally will be prevented.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a longitudinal sectional view through a reamer carrying shaft showing the support and feeder therefor embodying the present invention.

Figure 2 is a detail plan view of the shaft gripping sleeve.

Figure 3 is a view in side elevation of the sleeve.

Referring more particularly to the drawings wherein like numerals of reference indicate corresponding parts throughout the several views, the numeral 1 indicates generally a portion of a supporting arm provided for maintaining a reamer in working position upon the head of an engine block, the essential features of which supporting arm form the subject matter of my Patent No. 1,781,338 of November 11th, 1930 and is here only shown to show the application of the present invention. The arm 1 at the outer end carries a reamer guide sleeve 2 which is also substantially covered in my copending application above referred to and this sleeve is adapted to receive the reamer carrying shaft 3, the lower end of which carries a reamer of any suitable character one form of which is indicated by the numeral 4.

The upper end of the sleeve 2 is exteriorly threaded as indicated at 5 and has threadably engaged thereover the lower end of a bearing housing shell 6 the interior diameter of which is materially greater than the shaft 3 to permit of the interpositioning between the wall thereof and the shaft 3 the shaft supporting bearing structure hereinafter described in detail.

The upper end of the shell 6 is reduced slightly and threaded as indicated at 7 to receive the similar threads formed about the inner face of the flange 8 formed about the periphery of a centrally apertured cap 9, the shaft 3 being adapted to extend through the central portion of this cap and to be snugly engaged thereby as shown.

Within the shell 6 intermediate its ends an annular rib 10 is formed the interior diameter of which is of a dimension to snugly receive the shaft 3.

Supported upon this rib 10 is a bearing washer 11 and surrounding the shaft directly beneath and bearing against the underside of the cap 9 is a second similar washer 12.

Surrounding the shaft 3 and centrally positioned between the washers 11 and 12 is a shaft gripping sleeve 13 the edges of which are longitudinally split as indicated at 14 and each end of which is also tapered to form the outer shoulders 15. At one point the sleeve may be split entirely through as shown so that a contraction thereof may be obtained without buckling.

Arranged against each end of the shaft engaging sleeve 13 is a cup bearing 16 which comprises an annular portion 17 which rests against the adjacent end of the sleeve 13 and a wedge shaped or tapered flange 18 which extends between the wall of the shell 6 and the adjacent shoulder 15 of the sleeve. These cup bearings 16 have interposed between them and the adjacent bearing washer the bearing balls 19 and the outer surface of the annular portion of each of the cup bearings is provided adjacent its inner edge with a rib 20 which acts to prevent displacement of the bearing balls when the shaft 3 is removed from the supporting bearing.

From the foregoing description it will be readily seen that by loosening the cap 9 upon the bearing housing shell 6 longitudinal movement of the reamer carrying tool 3 through the bearing may be effected and when the cap 9 is tightened up upon the shell the washer 12 which abuts its under face will be forced inwardly and the result will be that the bearing cups 16 will have the tapered flanges thereof forced against the shoulders of the split sleeve to press the ends of the sleeve against the shaft. This will, of course, cause the sleeve to grip the shaft and to prevent its longitudinal movement through the bearing.

However, the bearing balls 19 will maintain contact with the shaft and will permit rotary movement thereof. When longitudinal adjustment of the shaft 3 is desired in order to move the reamer carried thereby into closer contact with a valve seat the entire bearing and housing shell is rotated upon the threaded end of the sleeve 2 so as to shift the shell in the desired direction longitudinally of the sleeve.

It will be readily seen from the foregoing that accurate adjustment of a reamer carrying shaft may be easily made when working upon a valve seat and while the shaft is held against longitudinal movement and permitted to rotate in the shell this rotary movement will not affect the shell by imparting any of the rotary movement thereto.

Having thus described my invention, what I claim is:—

1. In a machine of the character described including a supporting arm and a sleeve carried thereby, a tool carrying shaft extending through and rotatably supported in said sleeve, a cylindrical shell surrounding the shaft, means connecting said shell with said sleeve whereby relative longitudinal movement of the shell on the sleeve may be effected, a pair of bearings arranged in spaced relation within the shell and having said shaft extended therethrough, means whereby said bearings may be shifted longitudinally in the shell, and means acting upon the shifting of the bearings to grip the shaft to prevent longitudinal movement of the same through the bearings.

2. In a machine of the character described including a supporting arm and a sleeve carried thereby, a tool carrying shaft extending through and rotatably supported in said sleeve, a cylindrical shell surrounding the shaft, means connecting said shell with said sleeve whereby relative longitudinal movement of the shell on the sleeve may be effected, a pair of bearings arranged in spaced relation within the shell and having said shaft extended therethrough, means whereby said bearings may be shifted longitudinally in the shell, a sleeve within the shell disposed between the bearings and surrounding the shaft and having longitudinal splits formed in the ends thereof, and means forming a part of each of said bearings adapted to act upon the split ends of said sleeve to force the same into gripping engagement with the shaft to prevent longitudinal movement thereof.

3. In a machine of the character described including a supporting arm and a sleeve carried thereby, a tool carrying shaft rotatably mounted in said sleeve, a cylindrical shell surrounding said shaft and having threaded engagement at one end with an adjacent end of said sleeve, a cap closing the other end of said shell and centrally apertured to permit the extension of the shaft therethrough, a sleeve within said shell surrounding the shaft and having the ends thereof longitudinally split and further having the ends formed to provide shoulders, and a bearing within the shell at each end of said sleeve comprising a pair of spaced annular members having bearing balls interposed therebetween, each of said bearings having the annular member adjacent the sleeve provided with an annular tapered extension adapted to bear against the adjacent sleeve shoulder.

4. In a machine of the character described including a supporting arm and a sleeve carried thereby, a rotatable tool carrying shaft extending through said sleeve, a body encircling the shaft, a pair of bearings surrounding the shaft within the said body, means for forcing said bearings together, an element interposed between the bearings and engaging the shaft and compressed against the shaft upon the shifting of the bearings, by said means, and connecting means between said body and said sleeve whereby the body and the sleeve may be longitudinaly shifted.

In testimony whereof I hereunto affix my signature.

GEORGE ELMER MOEN.